United States Patent
Sugimoto et al.

(10) Patent No.: US 8,564,204 B2
(45) Date of Patent: Oct. 22, 2013

(54) VEHICLE HEADLAMP APPARATUS AND CONTROL METHOD THEREOF

(75) Inventors: Atsushi Sugimoto, Shizuoka (JP); Hirohisa Deguchi, Shizuoka (JP); Shoichiro Yokoi, Shizuoka (JP); Yuji Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 558 days.

(21) Appl. No.: 12/555,010

(22) Filed: Sep. 8, 2009

(65) Prior Publication Data
US 2010/0060169 A1 Mar. 11, 2010

(30) Foreign Application Priority Data

Sep. 8, 2008 (JP) .................................. 2008-230336

(51) Int. Cl.
*B60Q 1/02* (2006.01)
*B60Q 1/14* (2006.01)
*H05B 37/02* (2006.01)
*H05B 39/04* (2006.01)
*H05B 41/36* (2006.01)
*F21V 9/00* (2006.01)

(52) U.S. Cl.
USPC ............... 315/82; 315/77; 315/291; 315/159; 362/510

(58) Field of Classification Search
USPC .......... 315/77, 291, 82, 88, 159, 83; 362/507; 307/10.8, 10.1; 250/221
See application file for complete search history.

(56) References Cited

U.S. PATENT DOCUMENTS

| | | | | | |
|---|---|---|---|---|---|
| 5,182,502 | A | * | 1/1993 | Slotkowski et al. | 315/159 |
| 5,837,994 | A | * | 11/1998 | Stam et al. | 250/208.1 |
| 6,049,171 | A | * | 4/2000 | Stam et al. | 315/82 |
| 6,861,809 | B2 | * | 3/2005 | Stam | 315/82 |
| 6,919,548 | B2 | * | 7/2005 | Stam et al. | 250/205 |
| 7,131,754 | B2 | * | 11/2006 | Schofield | 362/466 |
| 8,045,760 | B2 | * | 10/2011 | Stam et al. | 382/104 |
| 8,120,652 | B2 | * | 2/2012 | Bechtel et al. | 348/113 |
| 2002/0154513 | A1 | * | 10/2002 | Yagi et al. | 362/510 |
| 2004/0201483 | A1 | * | 10/2004 | Stam et al. | 340/600 |
| 2008/0029701 | A1 | * | 2/2008 | Onozawa et al. | 250/332 |
| 2008/0259625 | A1 | * | 10/2008 | Noyori et al. | 362/507 |
| 2010/0060127 | A1 | * | 3/2010 | Sazuka et al. | 313/1 |

FOREIGN PATENT DOCUMENTS

| | | |
|---|---|---|
| JP | 2005-50139 A | 2/2005 |
| JP | 2008-41572 A | 2/2008 |

* cited by examiner

*Primary Examiner* — Shawki Ismail
*Assistant Examiner* — Dylan White
(74) *Attorney, Agent, or Firm* — Sughrue Mion, PLLC

(57) ABSTRACT

A vehicle headlamp apparatus is provided. The vehicle headlamp apparatus includes a first lamp configured to selectively produce a first high beam light distribution pattern and an infrared light distribution pattern, a second lamp configured to selectively produce a second high beam light distribution pattern and a low beam light distribution pattern, a vehicle detector which detects a vehicle running ahead, and a condition-dependent selection controller which controls the first and second lamps. The condition-dependent selection controller controls the second lamp to produce the low beam light distribution pattern when the vehicle detector detects a vehicle and to produce the second high beam light distribution pattern when the vehicle detector detects no vehicle. The condition-dependent selection controller controls the first lamp to produce the infrared light distribution pattern, irrespective of whether the vehicle detector detects a vehicle.

12 Claims, 7 Drawing Sheets

| SWITCH POSITION | HIGH/INFRARED SWITCHABLE LAMP | HIGH/LOW SWITCHABLE LAMP |
|---|---|---|
| HIGH | HIGH BEAM | HIGH BEAM |
| LOW | INFRARED | LOW BEAM |

|  |  | HIGH/INFRARED SWITCHABLE LAMP | HIGH/LOW SWITCHABLE LAMP |
|---|---|---|---|
| SMART BEAM SELECTION | HIGH | INFRARED | HIGH BEAM |
|  | LOW | INFRARED | LOW BEAM |

FIG. 8

| SWITCH POSITION | | HIGH/INFRARED SWITCHABLE LAMP | HIGH/LOW SWITCHABLE LAMP |
|---|---|---|---|
| HIGH | | HIGH BEAM | HIGH BEAM |
| LOW | | INFRARED | LOW BEAM |
| SMART BEAM SELECTION | HIGH | INFRARED | HIGH BEAM |
| | LOW | INFRARED | LOW BEAM |

VEHICLE HEADLAMP APPARATUS AND CONTROL METHOD THEREOF

CROSS-REFERENCE TO RELATED APPLICATION

The present application claims priority from Japanese Patent Application No. 2008-230336 filed on Sep. 8, 2008, the entire content of which is incorporated herein by reference.

FIELD OF INVENTION

Apparatuses and methods consistent with the present invention relate to a headlamp which is used in, for example, vehicles.

DESCRIPTION OF RELATED ART

Generally, vehicle headlamps are operable to selectively produce a low beam and a high beam. The low beam is used when driving in, for example, urban areas to irradiate a near region. A light distribution pattern of the low beam is regulated so as not to give glare to vehicles running ahead such as oncoming vehicles and preceding vehicles. The high beam is used when driving on, for example, thruways where there are no or few oncoming vehicles and preceding vehicles and irradiates a wider range including a distant region with relatively high illumination intensity.

The high beam provides a better field of vision than the low beam but gives glare to vehicles running ahead. In order to effectively avoid giving glare, there is proposed a smart beam system which is configured to automatically select the high beam or the low beam depending on conditions surrounding the vehicle. The smart beam system may have a high/low switchable lamp in which an actuator is used to drive a movable shade to select the high beam or the low beam. According to the smart beam system, the high beam can be selected as much as possible, without giving glare to a vehicle running ahead, to provide a better field of vision. Further, in order to monitor a condition in front of the vehicle, an infrared projector may be used in combination with the smart beam system.

According to a related art, an infrared projector is turned on and off or dimmed depending on a brightness level around the vehicle (see, e.g., JP 2005-050139 A).

However, in this related art, the infrared projector may be frequently turned on and off in which case a light source of the infrared projector undergoes excessive stress. Thus, a lifetime of the light source may be shortened.

In another related art, there is proposed a high/infrared switchable lamp having an infrared transmission filter which is arranged in front of a light source bulb. The infrared transmission filter is driven by an actuator to select a high beam mode or an infrared ray projecting mode (see, e.g., JP 2008-041572 A). More specifically, the high beam mode is selected when the infrared transmission filter is turned down, and the infrared ray projecting mode is selected when the infrared transmission filter to turned up.

However, if the high/infrared switchable lamp is used in the smart beam system, high durability is required for the actuator of the high/infrared switchable lamp because the infrared transmission filter may be frequently operated to select the high beam. Thus, a size and cost of the actuator will be increased.

SUMMARY OF INVENTION

According to an illustrative aspect of the present invention, a vehicle headlamp apparatus is provided. The vehicle headlamp apparatus includes a first lamp configured to selectively produce a first high beam light distribution pattern and an infrared light distribution pattern, a second lamp configured to selectively produce a second high beam light distribution pattern and a lower beam light distribution pattern, a vehicle detector which detects a vehicle running ahead, and a condition-dependent selection controller which controls the first and second lamps. The condition-dependent selection controller controls the second lamp to produce the low beam light distribution pattern when the vehicle detector detects a vehicle and to produce the second high beam light distribution pattern when the vehicle detector detects no vehicle. The condition-dependent selection controller controls the first lamp to produce the infrared light distribution pattern, irrespective of whether the vehicle detector detects any vehicle.

Other aspects and advantages of the present invention will be apparent from the following description, the drawings and the claims.

BRIEF DESCRIPTION OF THE DRAWINGS

FIG. 8 is a diagram showing a relationship between positions of a mode selection switch according to a second exemplary embodiment of the present invention and the light distribution patterns to be produced by the high/infrared switchable lamp and the high/low switchable lamp;

DETAILED DESCRIPTION OF EXEMPLARY EMBODIMENTS OF INVENTION

Hereinafter, exemplary embodiments of the present invention will be explained in detail with reference to the drawings. The following exemplary embodiments are examples only and do not limit the scope of the present invention as defined by the claims.

First Exemplary Embodiment

Figure 1:
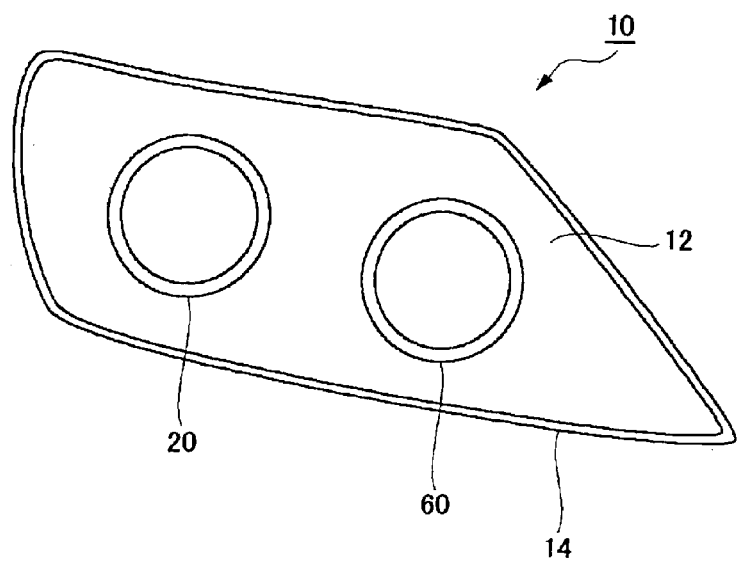
FIG. 1 is a front view of a vehicle headlamp according to a first exemplary embodiment of the present invention.

FIG. 1 is a front view of a vehicle headlamp 10 according to the first exemplary embodiment. The headlamp 10 of FIG. 1 is mounted on a right side (a left side when viewed from the front of the vehicle) of a front part of the vehicle. The vehicle headlamp 10 has a transparent cover 12 and a lamp body 14. The lamp body 14 may be made of synthetic-resin, and has a front opening to which the transparent cover 12 is attached. Inside a lamp chamber S surrounded by the transparent cover 12 and the lamp body 14 (see FIG. 2), a high/infrared switchable lamp 60 (a first lamp) and a high/low switchable lamp 20 (a second lamp) are arranged. Between the high/low switchable lamp 20 and the high/infrared switchable lamp 60, and the transparent cover 12, a plurality of extensions (e.g., extension 27a, 27b, 27c, 27e shown in FIG. 2) are arranged to cover a region surrounding the high/low switchable lamp 20 and the high/infrared switchable lamp 60 when viewed from the front of the headlamp 10.

The high/low switchable lamp 20 according to the first exemplary embodiment is configured as a single lamp unit having a light source and a light shielding shade arranged in front of the light source. A light distribution pattern to be produced by the high/low switchable lamp 20 is switched between a low beam light distribution pattern and a high beam light distribution pattern by moving the light shielding shade. For example, the light shielding shade may be moved to be in an upright position to produce the low beam light distribution pattern, and the light shielding shade may be moved to be in a tilted position to produce the high beam light distribution pattern. Because such a high/low switchable lamp is well known in the art, a detailed description thereof will be omitted herein.

Figure 2:
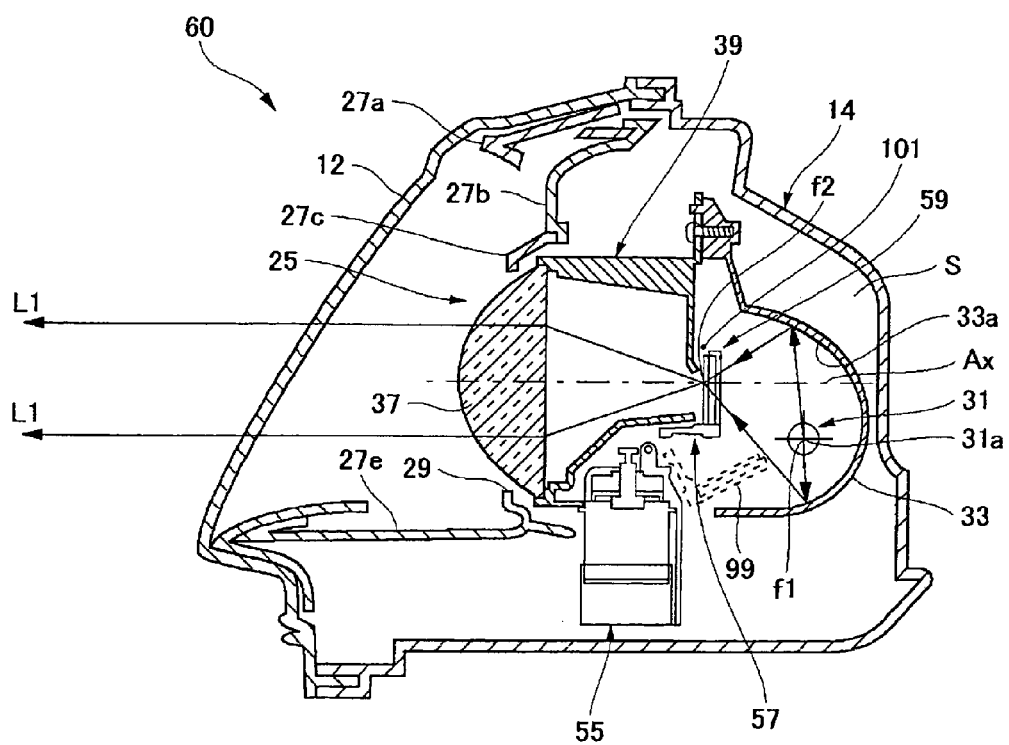
FIG. 2 is a sectional view of a high/infrared switchable lamp of the vehicle headlamp of FIG. 1.

FIG. 2 is a sectional view of the high/infrared switchable lamp 60. As shown in FIG. 2, the high/infrared switchable lamp 60 has a projection-type lamp unit 25. The lamp unit 25 is accommodated inside the lamp chamber S and is supported by an aiming mechanism (not shown). The aiming mechanism allows an orientation of the lamp unit 25 to be adjusted in vertical and lateral directions.

Inside the lamp body 14, the extensions 27a, 27b, 27c, 27e are arranged to form an opening 29 through which a front face of the lamp unit 25 is exposed while concealing portions of the lamp unit 25 from view.

The lamp unit 25 has a light source 31, a reflector 33 to which the light source 31 is attached, a lens holder 39 attached to the front of the reflector 33, and a projection lens 37 (e.g., a plano-convex lens) attached to the front of the lens holder 39. The light source 31 according to this exemplary embodiment is a lamp bulb having a filament 31a, but may be other types of light source. The reflector 33 may be formed by an aluminum die-casting. The projection lens 37 is disposed on an optical axis Ax of the lamp unit 25. The optical axis Ax extends in a front-and-rear direction of the vehicle on which the headlamp 10 is mounted.

The reflector 33 has an ellipsoidal reflecting surface 33a which is configured to reflect light from the light source 31 toward the optical axis Ax. The reflecting surface 33a may be formed by aluminum deposition. The reflector 33 has a first focal point f1 and a second focal point f2.

The lamp unit 25 is configured such that the filament 31a of the light source 31 is located at the first focal point f1 of the reflector 33 and such that the second focal point f2 of the reflector 33 is located in a vicinity of a rear focal point of the projection lens 37. According to this configuration, the light reflected by the reflecting surface 33a of the reflector 33 is projected though the projection lens 37 as light beams L1 which are almost parallel to each other.

The lamp unit 25 is configured to project a high beam light distribution pattern.

The high/infrared switchable lamp 60 further includes an infrared transmission filter 59 which converts light passing therethrough into infrared rays. The infrared transmission filter 59 is disposed in front of the light source 31 and between the reflector 33 and the projection lens 37. The infrared transmission filter 59 is supported by a bracket 57 which is coupled to an actuator 55. The actuator 55 moves the infrared transmission filter 59, via the bracket 57, between a transmitting position 101, at which the light reflected by the reflector 33 enters the infrared transmission filter 59, and a retracted position 99 which allows the light reflected by the reflector 33 to directly enter the projection lens 37.

When the actuator 55 moves the infrared transmission filter 59 to the transmitting position 101, the high/infrared switchable lamp 60 projects an infrared light distribution pattern. When the actuator 55 moves the infrared transmission filter 59 to the retracted position 99, the high/infrared switchable lamp 60 projects the high beam light distribution pattern. The infrared rays projected ahead of the vehicle may be reflected by an object in front of the vehicle and captured by an infrared camera 116, whereby pedestrians and vehicles in front an be detected even during the nighttime.

Figure 3:
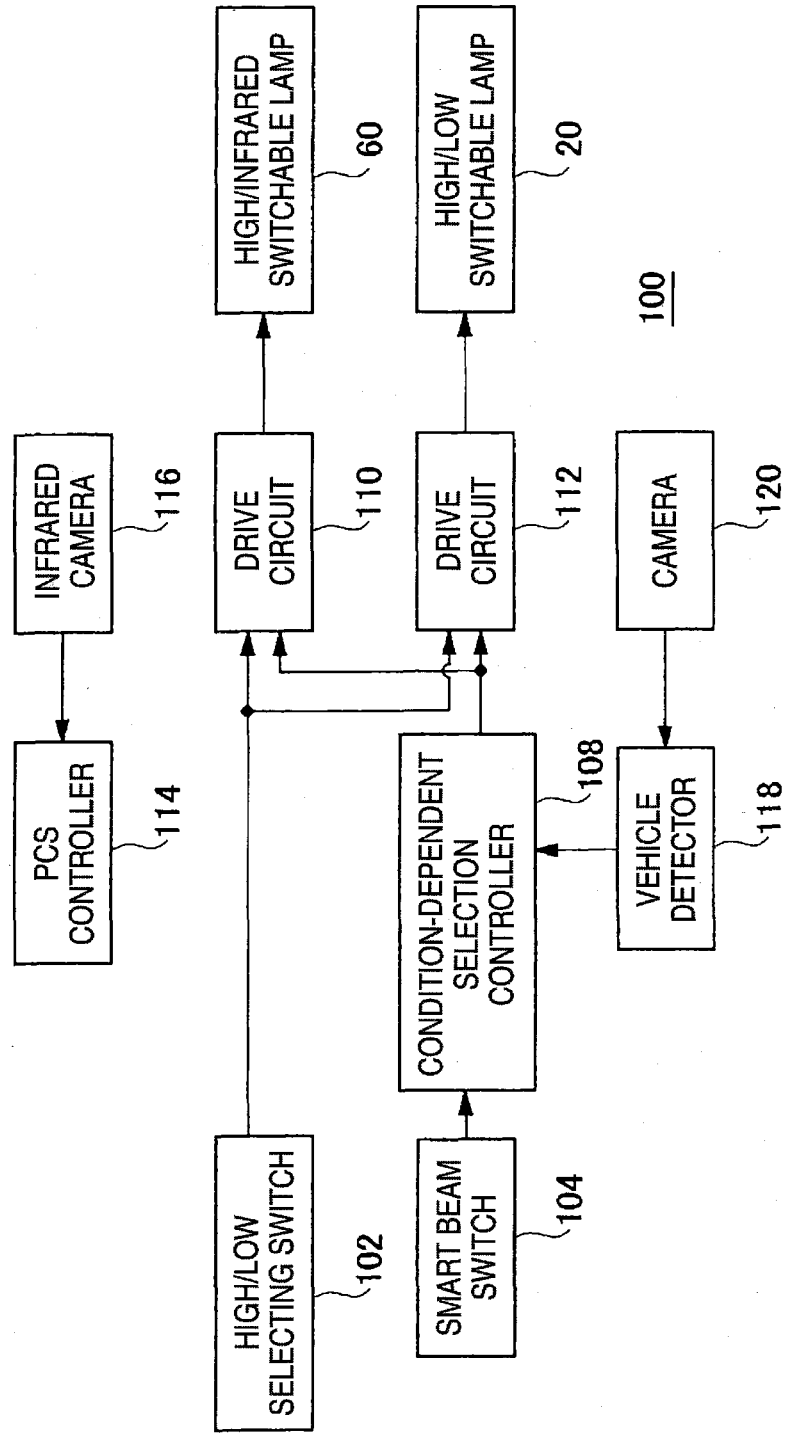
FIG. 3 is a block diagram of an electrical configuration of a vehicle headlamp apparatus including the vehicle headlamp of FIG. 1.

FIG. 3 is a block diagram of a vehicle headlamp apparatus 100 which includes the vehicle headlamp 10. Individual blocks illustrated in the diagram of FIG. 3 may be implemented by using mechanical apparatuses and/or electronic devices such as a central processing unit (CPU) and a memory in term of hardware, and may be implemented by using computer programs in terms of software. These blocks are depicted as functional blocks which are implemented by hardware, software or a combination thereof. It is to be noted that those skilled in the art will understand that these functional blocks can be implemented in various ways and various combinations of hardware and software.

The high/low switchable lamp 20 is coupled to a drive circuit 112. In accordance with external instructions, the drive circuit 112 drives the high/low switchable lamp 20 to irradiate a region ahead with the high beam light distribution pattern or the low beam light distribution pattern.

The high/infrared switchable lamp 60 is coupled to a drive circuit 110. In accordance with external instructions, the drive circuit 110 drives the actuator 55 and the light source 31 of the high/infrared switchable lamp 60 to irradiate a region ahead with the high beam light distribution pattern or the infrared light distribution pattern.

A high/low selecting switch 102 is disposed inside a passenger compartment of the vehicle, and is manually operable by a driver of the vehicle to select one of the high beam or the low beam. The switch 102 is coupled to the drive circuits 110, 112. Depending on the position of the switch 102, the high/low switchable lamp 20 and the high/infrared switchable lamp 60 irradiates the region ahead with certain light distribution patterns.

The infrared camera 116 captures the infrared rays projected from the high/infrared switchable lamp 60 and reflected by an object in front of the vehicle. The infrared camera 116 may be disposed in an upper region inside the passenger compartment, for example, in the vicinity of a rearview mirror. A pre-crash safety (PCS) controller 114 executes image processing such as edge processing and pattern recognition with respect to images captured by the infrared camera 116 to detect a pedestrian, an obstacle, etc. in front of the vehicle. When the PCS controller 114 determines that a distance between the vehicle and a pedestrian and/or an obstacle in front of the vehicle is shorter than a certain distance, safety measures are instructed such as winding up of a seat belt and/or a reduction of a vehicle speed. Because such a pre-crash safety system is well known in the art, a detailed description thereof will be omitted herein.

A camera 120 captures an image of a region in front of the vehicle. A vehicle detector 118 executes image processing with respect to images captured by the camera 120 to recognize headlamps or tail lamps of other vehicles within the images so as to detect the other vehicles running ahead. Where the vehicle detector 118 detects an oncoming vehicle for example, the vehicle detector 118 sends the detection information to a condition-dependent selection controller 108.

According to the first exemplary embodiment, a smart beam switch 104 is disposed inside the passenger compartment in addition to the high/low selecting switch 102. The smart beam switch 104 is manually operable by a driver of the vehicle to select a smart beam mode. More specifically, the smart beam switch 104 is manually operable to activate or to deactivate the condition-dependent selection controller 108. When the condition-dependent selection controller 108 is activated so that the smart beam mode is selected, the condition-dependent selection controller 108 controls, depending on conditions surrounding the vehicle, the light distribution patterns to be produced by the high/low switchable lamp 20 and the high/infrared switchable lamp 60. During the smart beam mode, the driver is not required to manually select the high beam or the low beam, and the driver's field of vision is improved because the high beam irradiation time is made as long as possible.

Figures 4, 5:
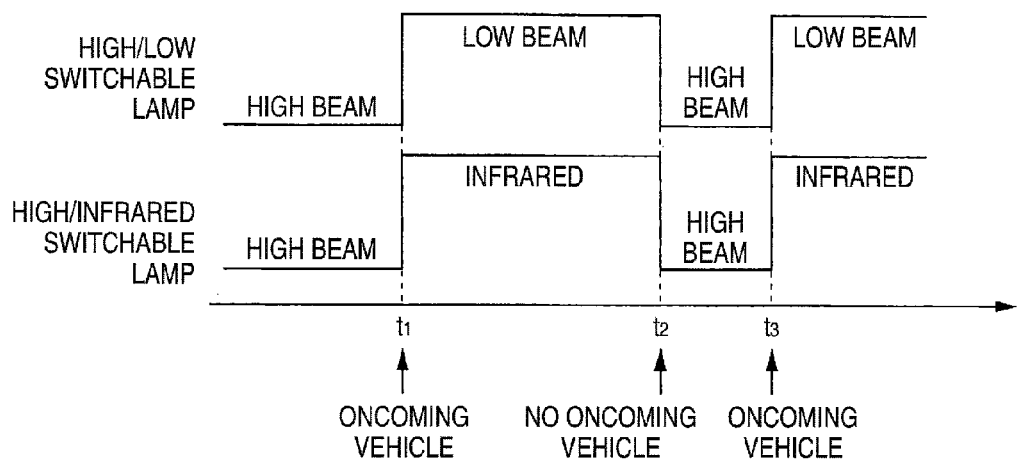
FIG. 4 is a diagram showing a relationship between positions of a high/low selecting switch and light distribution patterns to be produced by the high/infrared switchable lamp and a high/low switchable lamp of the vehicle headlamp.
FIG. 5 is an explanatory diagram showing operations of the high/low switchable lamp and the high/infrared switchable lamp in a case in which the light distribution patterns to be produced by the high/low switchable lamp and the high/infrared switchable lamp are switched in the same manner as shown in FIG. 4 while a smart beam system is in operation.

FIG. 4 is a diagram showing a relationship between the positions of the high/low selecting switch 102 and the light distribution patterns to be produced by the high/low switchable lamp 20 and the high/infrared switchable lamp 60. As shown in FIG. 4, when the high beam is selected, the high/low switchable lamp 20 produces the high beam light distribution pattern and the high/infrared switchable lamp 60 also produces the high beam light distribution pattern. Where the low beam is selected, the high/low switchable lamp 20 produces the low beam light distribution pattern and the high/infrared switchable lamp 60 produces the infrared light distribution pattern. In the latter case, the PCS controller 114 utilizes the infrared rays projected from the high/infrared switchable lamp 60 to detect a pedestrian and/or an obstacle ahead, thereby making up for a narrow irradiation area due to the selection of the low beam.

FIG. 5 is an explanatory diagram showing operations of the high/low switchable lamp 20 and the high/infrared switchable lamp 60 in a case in which the light distribution patterns to be produced by the high/low switchable lamp 20 and the high/infrared switchable lamp 60 are switched in the same manner as shown in FIG. 4 during a smart beam mode. As shown in FIG. 5, in this case, both the high/low switchable lamp 20 and the high/infrared switchable lamp 60 basically produce the high beam light distribution patterns unless a vehicle running ahead is detected by the vehicle detector 118. If the vehicle detector 118 detects an oncoming vehicle at a timing t1 for example, the high/low switchable lamp 20 is controlled to change its light distribution pattern to the low beam light distribution pattern, and the high/infrared switchable lamp 60 is controlled to change its light distribution pattern to the infrared light distribution pattern. When the oncoming vehicle becomes undetected at a timing t2, both the high/low switchable lamp 20 and the high/infrared switchable lamp 60 are controlled to change their light distribution patterns to the high beam light distribution patterns. Further, if an oncoming vehicle is detected again at a timing t3, the high/low switchable lamp 20 is controlled to change its light distribution pattern to the low beam light distribution pattern, and the high/infrared switchable lamp 60 is controlled to change its light distribution pattern to the infrared light distribution pattern. Accordingly, both the high/low switchable lamp 20 and the high/infrared switchable lamp 60 are controlled to change their light distribution patterns each time an oncoming vehicle is detected. Thus, in this case, the number of operations of the actuator 55 to move the infrared transmission filter 59 will largely increase as compared with a case in which a driver manually selects the high beam or the low beam, resulting in a decrease in lifetime of the actuator 55.

Thus, the smart beam mode according to the first exemplary embodiment is designed in order to decrease the number of operations of the actuator 55 of the high/infrared switchable lamp 60.

Figures 6, 7:
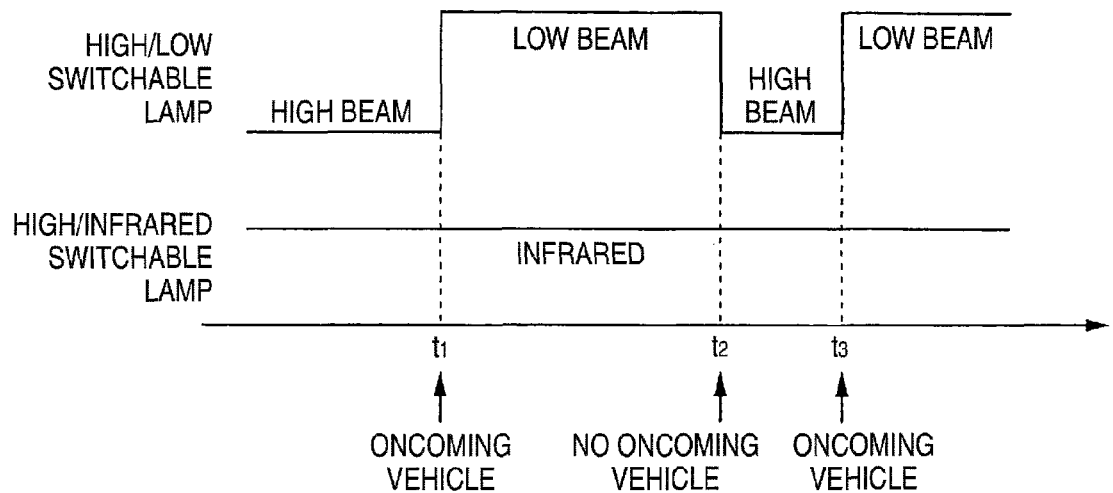
FIG. 6 is a diagram showing how the light distribution patterns to be produced by the high/infrared switchable lamp and the high/low switchable lamp are switched while a smart beam system according to the first exemplary embodiment is in operation.
FIG. 7 is an explanatory diagram showing operations of the high/low switchable lamp and the high/infrared switchable lamp in a case in which the light distribution patterns to be produced by the high/low switchable lamp and the high/infrared switchable lamp are switched in the manner shown in FIG. 6.

FIG. 6 is a diagram showing how the light distribution patterns to be produced by the high/infrared switchable lamp 60 and the high/low switchable lamp 20 are switched while the smart beam system according to the first exemplary embodiment is being selected. As shown in FIG. 6, when the low beam is required, the high/low switchable lamp 20 produces the low beam light distribution pattern, and the high/infrared switchable lamp 60 produces the infrared light distribution pattern. This is the same as the example of FIG. 5. However, when the high beam is required, the high/low switchable lamp 20 is controlled to switch its light distribution pattern to the high beam light distribution pattern, while the high/infrared switchable lamp 60 is controlled to maintain its light distribution pattern unchanged from the infrared light distribution pattern.

FIG. 7 is an explanatory diagram showing operations of the high/low switchable lamp 20 and the high/infrared switchable lamp 60 in a case in which the light distribution patterns to be produced by the high/low switchable lamp 20 and the high/infrared switchable lamp 60 are switched in the manner shown in FIG. 6. As shown in FIG. 7, the high/low switchable lamp 20 is controlled to change its light distribution pattern to the low beam light distribution pattern when the vehicle detector 118 detects an oncoming vehicle at timing t1 and t3, and to change its light distribution pattern to the high beam light distribution pattern when the oncoming vehicle becomes undetectable at the timing t2. On the other hand, the high/infrared switchable lamp 60 is controlled to continuously produce the infrared light distribution pattern, irrespective of whether an oncoming vehicle is detected. Thus, it is possible to suppress the number of operations of the actuator 55 of the high/infrared switchable lamp 60, thereby suppressing a decrease in lifetime of the actuator 55.

As described above, according to the smart beam mode of the first exemplary embodiment, the condition-dependent selection controller 108 controls the high/low switchable lamp 20 to change its light distribution pattern from the high beam light distribution pattern to the low beam light distribution pattern when the vehicle detector 118 detects a vehicle running ahead, and to change its light distribution pattern from the low bean light distribution pattern to the high beam light distribution pattern when the vehicle detector 118 detects no vehicles. The condition-dependent selection controller 108 controls the high/infrared switchable lamp 60 to produce, irrespective of whether the vehicle detector 118 detects a vehicle, the infrared light distribution pattern. That is, during the smart beam mode, the number of operations of the actuator 55 of the high/infrared switchable lamp 60 is substantially zero. Thus, a decrease in lifetime of the beam switching mechanism of the high/infrared switchable lamp 60 can be suppressed.

The high/infrared switchable lamp 60 may be configured to increase a voltage applied to the light source 31 when its light distribution pattern is switched from the infrared light distribution pattern to the high beam light distribution pattern to increase light intensity of the high beam light distribution pattern. Likewise, the high/infrared switchable lamp 60 may be configured to apply a battery voltage to the light source 31 when producing the high beam light distribution pattern, and to reduce a voltage applied to the light source 31 when its light distribution pattern is switched from the high beam light distribution pattern to the infrared light distribution pattern. Even in such configurations, it is possible to suppress a decrease in lifetime of the light source 31, because the high/infrared switchable lamp 60 is controlled to maintain its light distribution pattern unchanged from the infrared light distribution pattern during the smart beam mode.

It is to be noted that, if the smart beam mode is not selected from the smart beam switch 104, the driver can manually switch the light distribution patterns of the the high/low switchable lamp 20 and the high/infrared switchable lamp 60, respectively, as shown in FIG. 4 by operating the high/low selecting switch 102. Such a manual operation of the high/low selecting switch 102 allows the driver to select the high beam in accordance with the driver's own decision, for example, when making a flash to other vehicles.

Further, the smart beam switch may be configured to allow a driver to select two types of smart beam modes, for example, to select one of the smart beam modes shown in FIGS. 5 and 7. In this case, when the condition-dependent selection controller 108 is activated so that the smart beam mode shown in FIG. 7 is selected, the smart beam switch may be further manually operable to select whether to allow the condition-dependent selection controller 108 to control the high/infrared switchable lamp 60 such that the high/infrared switchable lamp 60 produces the high beam light distribution pattern if the vehicle detector 118 detects no vehicle.

Second Exemplary Embodiment

In the first exemplary embodiment, it is when the driver selected the smart beam mode from the smart beam switch 104 that the condition-dependent selection controller 108 controls the high/infrared switchable lamp 60 to produce the infrared light distribution pattern irrespective of whether a vehicle running ahead is detected. In a second exemplary embodiment, instead of the high/low selecting switch 102 and the smart beam switch 104, a mode selection switch is disposed in the passenger compartment. The mode selection switch is manually operable by the driver to select one of a low beam mode, a high beam mode, and a smart beam mode (a condition dependent mode).

FIG. 8 is a diagram showing a relationship between positions of the mode selection switch and the light distribution patterns to be produced by the high/infrared switchable lamp 60 and the high/low switchable lamp 20. When the mode selection switch is positioned to select the high beam mode, the condition-dependent selection controller 108 controls both the high/infrared switchable lamp 60 and the high/low switchable lamp 20 to irradiate in the high beam light distribution patterns.

When the mode selection switch is positioned to select the low beam mode, the condition-dependent selection controller 108 controls the high/infrared switchable lamp 60 to produce the infrared light distribution pattern and controls the high/low switchable lamp 20 to produce the low beam light distribution pattern.

When the mode selection switch is positioned to select the smart beam mode, the condition-dependent selection controller 108 controls the high/low switchable lamp 20 to produce the low beam light distribution pattern if the vehicle detector 118 detects any vehicle running ahead and to produce the high beam light distribution pattern if the vehicle detector 118 detects no vehicles. On the other hand, the condition-dependent selection controller 108 controls the high/infrared switchable lamp 60 to produce, irrespective of whether any vehicle is detected, the infrared light distribution pattern.

The mode selection switch may be manually operable to further select another smart beam mode shown in FIG. 5. That is, if the vehicle detector 118 detects any vehicle running ahead while the another smart beam mode is being selected, the condition-dependent selection controller 108 controls the high/low switchable lamp 20 to produce the low beam light distribution pattern and controls the high/infrared switchable lamp 60 to produce the infrared light distribution pattern. Further, if the vehicle detector 118 detects no vehicle while the another smart beam mode is being selected, the condition-dependent selection controller 108 controls the high/low switchable lamp 20 and the high/infrared switchable lamp 60 to produce the high beam light distribution patterns respectively.

According to the second exemplary embodiment in which the mode selection switch described above is provided, a driver can select the desirable mode from a single switch.

Figure 9:
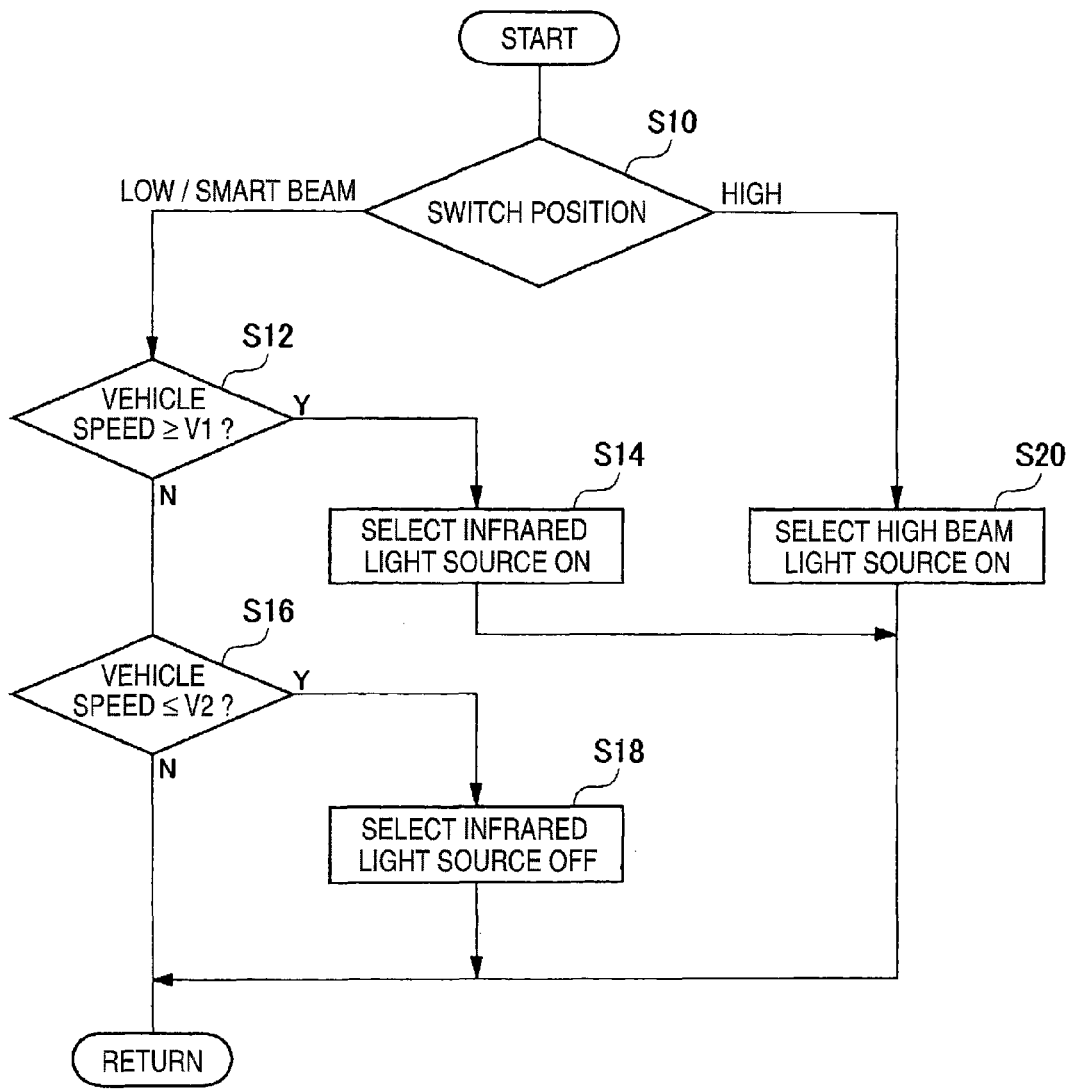
FIG. 9 is a flow chart of an operation example of a condition-dependent selection controller in a vehicle headlamp apparatus having the mode selection switch.

FIG. 9 is a flow chart of an operation example of the condition-dependent selection controller 108 in a vehicle headlamp apparatus having the mode selection switch described above. First, the condition-dependent selection controller 108 reads a position of the mode selection switch (S10). If the low beam mode or the smart beam mode is being selected, the condition-dependent selection controller 108 determines whether a vehicle speed detected by a vehicle speed sensor is equal to or higher than a first threshold value V1 (e.g., 13 km/h) (S12). If the vehicle speed is equal to or higher than the first threshold value V1 (S12; YES), the condition-dependent selection controller 108 drives the actuator 55 of the high/infrared switchable lamp 60 to select the infrared light distribution pattern and turns on the light source 31 (S14). If the vehicle speed is lower than the first threshold value V1 (S12; NO), the condition-dependent selection controller 108 determines whether the vehicle speed is equal to or lower than a second threshold value V2 (e.g, 10 km/h) which is smaller than the first threshold value V1 (S16). If the vehicle speed is equal to or lower than the second threshold value V2 (S16; YES), the condition-dependent selection controller 108 drives the actuator 55 of the high/infrared switchable lamp 60 to select the infrared light distribution pattern, but turns the light source 31 off (S18). If the vehicle speed is higher than the second threshold value V2 (S16; NO), this flow returns to S10.

If the high beam mode is being selected in S10, the condition-dependent selection controller 108 drives the actuator 55 of the high/infrared switchable lamp 60 to select the high beam light distribution pattern and turns on the light source 31 (S20).

According to the operation example described above, the light source 31 is turned off for the infrared irradiation if the vehicle speed is equal to or lower than a certain speed. This is advantageous in that human eyes can be prevented from being adversely affected due to a long-time exposure to infrared rays coming from a vehicle that is being stopped or running at low speed. Further, it is advantageous that the actuator 55 is not driven until the vehicle speed reaches a certain speed after the start of running. This is advantageous in that the driving noise of the actuator 55 can be prevented from being recognized by the driver when the vehicle is being stopped.

Figure 10:
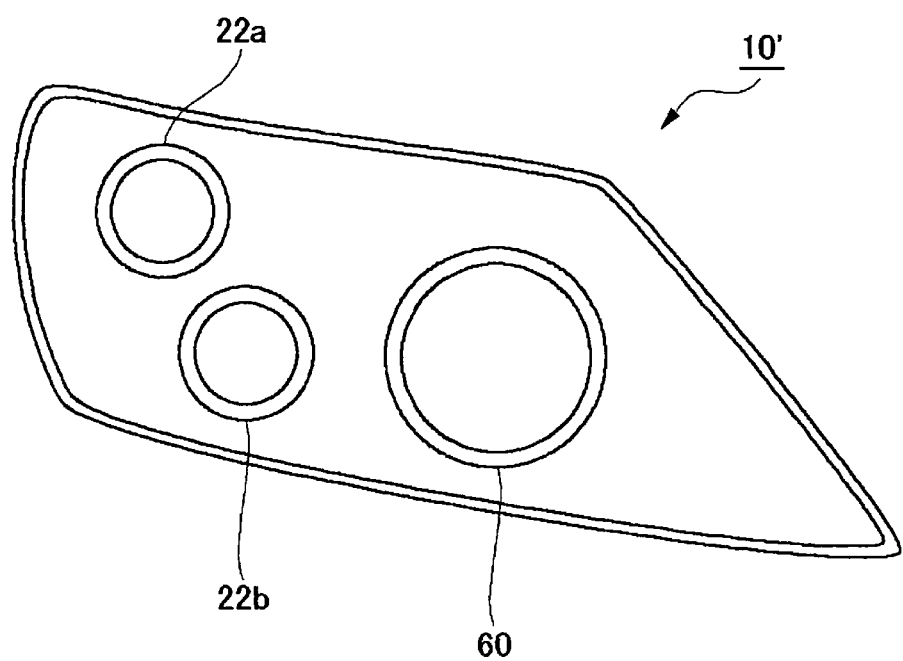
FIG. 10 is a front view of a vehicle headlamp according to another exemplary embodiment of the present invention.

FIG. 10 is a front view of a vehicle headlamp 10' according to another exemplary embodiment of the present invention. In the first exemplary embodiment, the high/low switchable lamp 20 is configured as a single lamp unit. However, in this another exemplary embodiment, the high/low switchable lamp includes a high beam lamp unit 22a and a low beam lamp unit 22b which are separately arranged. According to yet another exemplary embodiment, the high/infrared switchable lamp may include two lamp units, namely, a high beam lamp unit and an infrared ray lamp unit that are separately arranged. In either case, combinations of light distribution patterns to be produced by the high/low switchable lamp and the high/infrared switchable lamp in the smart beam mode are the same as those of the first exemplary embodiment.

According to the exemplary embodiments described above, a vehicle headlamp apparatus has a smart beam system which automatically selects the low beam or the high beam. However, stress applied to an actuator and/or a light source of the high/infrared switchable lamp due to the selection of the high beam is reduced. Thus, it is possible to improve life duration of the actuator and/or the light source of the high/infrared switchable lamp.

Further, when switching between the high beam and the low beam during the smart beam mode, only the light distribution pattern of the high/low switchable lamp is switched and the light distribution pattern of the high/infrared switchable lamp is maintained. Therefore, as compared with a case in which the light distribution patterns of the high/low switchable lamp and the high/infrared switchable lamp are both switched together, a change in illumination intensity at the time of switching of the high beam and the low beam can be made smaller, thereby giving less influence to the driver. It is to be noted that the driver's field of vision, especially long distance visibility, can still be greatly improved only with the high beam light distribution pattern projected from one of the lamps. Thus, the advantageous effect of the smart beam system can be sufficiently maintained.

While the present invention has been shown and described with reference to certain exemplary embodiments thereof, it will be understood by those skilled in the art that various changes in form and details, including combinations of features of different exemplary embodiments, may be made therein without departing from the spirit and scope of the present invention as defined by the appended claims.

What is claimed is:

1. A vehicle headlamp apparatus comprising:
   a first lamp configured to selectively produce a first high beam light distribution pattern and an infrared light distribution pattern, the first lamp switches only between the first high beam light distribution pattern and the infrared light distribution pattern;
   a second lamp configured to selectively produce a second high beam light distribution pattern and a low beam light distribution pattern, the second lamp switches only between the second high beam light distribution pattern and the low beam light distribution pattern;
   a vehicle detector which detects a vehicle running ahead based on received infrared light;
   a condition-dependent selection controller which controls the first and second lamps; and
   at least one switch which is manually operable to select one of a low beam mode, a high beam mode, and a condition dependent mode comprising a first condition dependent mode and a second condition dependent mode,
   wherein the condition-dependent selection controller controls the first lamp to produce the infrared light distribution pattern irrespective of whether the vehicle detector detects a vehicle and the second lamp to produce the low beam light distribution pattern irrespective of whether the vehicle detector detects a vehicle if the low beam mode is being selected; and
   the condition-dependent selection controller controls the first lamp to produce the first high beam light distribution pattern irrespective of whether the vehicle detector detects a vehicle and the second lamp to produce the second high beam light distribution pattern irrespective of whether the vehicle detector detects a vehicle if the high beam mode is being selected,
   if the first condition dependent mode is selected,
      the condition-dependent selection controller controls the first lamp to produce the infrared light distribution pattern and controls the second lamp to produce the low beam light distribution pattern, if the vehicle detector detects a vehicle and
      the condition-dependent selection controller controls the first lamp to produce the first high beam light distribution pattern and controls the second lamp to produce the second high beam light distribution pattern, if the vehicle detector detects no vehicle, and
   if the second condition dependent mode is selected,
      the condition-dependent selection controller controls the second lamp to produce the low beam light distribution pattern if the vehicle detector detects a vehicle and to produce the second high beam light distribution pattern if the vehicle detector detects no vehicle, and
      the condition-dependent selection controller controls the first lamp to produce the infrared light distribution pattern, irrespective of whether the vehicle detector detects a vehicle.

2. The vehicle headlamp apparatus according to claim 1, wherein the at least one switch comprises a first switch which is manually operable to activate or to deactivate the condition-dependent selection controller.

3. The vehicle headlamp apparatus according to claim 2, wherein the at least one switch further comprises
   a second switch which is manually operable to select one of the low beam mode and the high beam mode, wherein
   when the low beam mode is selected while the condition-dependent selection controller is deactivated, the first lamp produces the infrared light distribution pattern and the second lamp produces the low beam light distribution pattern, and
   when the high beam mode is selected while the condition-dependent selection controller is deactivated, the first lamp produces the first high beam light distribution pattern and the second lamp produces the second high beam light distribution pattern.

4. The vehicle headlamp apparatus according to claim 2, wherein, when the condition-dependent selection controller is activated, the first switch is further manually operable to select whether to allow the condition-dependent selection controller to control the first lamp such that the first lamp produces the first high beam light distribution pattern if the vehicle detector detects no vehicle.

5. The vehicle headlamp apparatus according to claim 1, wherein the at least one switch comprises a mode selection switch which is manually operable to select one of the low beam mode, the high beam mode, and the condition dependent mode, wherein
when the low beam mode is selected, the condition-dependent selection controller controls the first lamp to produce the infrared light distribution pattern and the second lamp to produce the low beam light distribution pattern,
when the high beam mode is selected, the condition-dependent selection controller controls the first lamp to produce the first high beam light distribution pattern and the second lamp to produce the second high beam light distribution pattern, and
when the condition dependent mode is selected, the condition-dependent selection controller controls the first and second lamp to produce the first condition dependent mode or the second condition dependent mode.

6. The vehicle headlamp apparatus according to claim 5, wherein the mode selection switch is manually operable to further select between the first condition dependent mode and the second condition dependent mode.

7. The vehicle headlamp apparatus according to claim 1, wherein the first lamp comprises:
a projection lens disposed on an optical axis extending in a front-and-rear direction of a vehicle on which the vehicle headlamp apparatus is mounted;
a light source disposed more rearward than a rear focal point of the projection lens;
a reflector which forwardly reflects light from the light source toward the optical axis;
an infrared transmission filter disposed between the reflector and the projections lens; and
an actuator which moves the infrared transmission filter between a transmitting position and a retracted position, wherein
when the infrared transmission filter is in the transmitting position, the infrared light distribution pattern is produced, and
when the infrared transmission filter is in the retracted position, the second high beam light distribution pattern is produced.

8. The vehicle headlamp apparatus according to claim 1, the condition-dependent selection controller controls the first lamp to produce the infrared light distribution pattern, irrespective of whether the vehicle detector detects a vehicle when the condition-dependent selection controller is activated.

9. The vehicle headlamp apparatus according to claim 1, wherein the first lamp is configured to increase a voltage applied to a light source when a light distribution pattern of the first lamp is switched from the infrared light distribution pattern to the first high beam light distribution pattern to increase light intensity of the first high beam light distribution pattern.

10. The vehicle headlamp apparatus according to claim 1, wherein the first lamp is configured to apply a battery voltage to a light source when producing the first high beam light distribution pattern, and to reduce a voltage applied to the light source when a light distribution pattern is switched from the high beam light distribution pattern to the infrared light distribution pattern.

11. A method of controlling a vehicle headlamp apparatus, the vehicle headlamp apparatus comprising:
a first lamp configured to selectively produce a first high beam light distribution pattern and an infrared light distribution pattern, the first lamp switches only between the first high beam light distribution pattern and the infrared light distribution pattern;
a second lamp configured to selectively produce a second high beam light distribution pattern and a low beam light distribution pattern, the second lamp switches only between the second high beam light distribution pattern and the low beam light distribution pattern; and
at least one switch which is manually operable to select one of a low beam mode, a high beam mode, and a condition dependent mode comprising a first condition dependent mode and a second condition dependent mode,
the method comprising:
detecting a vehicle running ahead of a vehicle on which the first lamp and the second lamp are mounted based on received infrared light;
determining which one of the low beam mode, the high beam mode, and the condition dependent mode is being selected;
if the low beam mode is being selected, controlling the first lamp to produce the infrared light distribution pattern irrespective of whether the vehicle detector detects a vehicle and the second lamp to produce the low beam light distribution pattern irrespective of whether the vehicle detector detects a vehicle,
if the high beam mode is being selected, controlling the first lamp to produce the first high beam light distribution pattern irrespective of whether the vehicle detector detects a vehicle and the second lamp to produce the second high beam light distribution pattern irrespective of whether the vehicle detector detects a vehicle,
if the condition dependent mode is being selected, determining which one of the first and second condition dependent mode is being selected,
if the first condition dependent mode is selected,
controlling the first lamp to produce the infrared light distribution pattern and controlling the second lamp to produce the low beam light distribution pattern, if the vehicle detector detects a vehicle and controlling the first lamp to produce the first high beam light distribution pattern and controlling the second lamp to produce the second high bear light distribution pattern, if the vehicle detector detects no vehicle, and
if the second condition dependent mode is selected,
controlling the second lamp to produce the low beam light distribution pattern if a vehicle running ahead is detected, controlling the second lamp to produce the second high beam light distribution pattern if no vehicle running ahead is detected; and controlling the first lamp to produce the infrared light distribution pattern, irrespective of whether a vehicle running ahead is detected.

12. The method according to claim 11, wherein the method further comprises:
detecting a vehicle speed of the detected vehicle running ahead of the vehicle if one of the low beam mode and the condition dependent mode is being selected;
turning on the first lamp to produce the infrared light distribution pattern if the vehicle speed is equal to or higher than a first threshold value; and
turning off the first lamp if the vehicle speed is equal to or lower than a second threshold value which is smaller than the first threshold value.

* * * * *